US009969548B2

(12) United States Patent
Fjetland (10) Patent No.: US 9,969,548 B2
(45) Date of Patent: May 15, 2018

(54) LIFTING DEVICE FOR CONTAINER AND METHOD FOR USING THE SAME (71) Applicant: Jack-Pack AS, Sandnes (NO)

(72) Inventor: Geir Tore Fjetland, Sandnes (NO)

(73) Assignee: Jack-Pack AS, Sandnes (NO)

( * ) Notice: Subject to any disclaimer, the term of this patent is extended or adjusted under 35 U.S.C. 154(b) by 0 days. days.

(21) Appl. No.: 14/647,891

(22) PCT Filed: Nov. 29, 2013

(86) PCT No.: PCT/NO2013/050209
§ 371 (c)(1),
(2) Date: May 28, 2015

(87) PCT Pub. No.: WO2014/088421
PCT Pub. Date: Jun. 12, 2014

(65) Prior Publication Data
US 2015/0298901 A1 Oct. 22, 2015

Related U.S. Application Data (60) Provisional application No. 61/733,749, filed on Dec. 5, 2012.

(30) Foreign Application Priority Data

Dec. 5, 2012 (NO) .................................. 20121459

(51) Int. Cl.
*B65D 90/18* (2006.01)
*B65D 90/00* (2006.01)
(Continued)

(52) U.S. Cl.
CPC ......... *B65D 90/0033* (2013.01); *B62D 63/06* (2013.01); *B65D 90/14* (2013.01); *B65D 90/18* (2013.01)

(58) Field of Classification Search
CPC .... B62D 63/06; B65D 90/0033; B65D 90/14; B65D 90/18
(Continued)

(56) References Cited

U.S. PATENT DOCUMENTS 2,319,581 A * 5/1943 Brownlee ............... B60B 33/06
15/323
2,656,942 A 10/1953 Helms
(Continued)

FOREIGN PATENT DOCUMENTS

DE 3442307 5/1986
DE 4440180 5/1996
(Continued)

OTHER PUBLICATIONS

International Search Report for PCT/NO2013/050209 dated Mar. 20, 2014.
(Continued)

*Primary Examiner* — Mark C Hageman
(74) *Attorney, Agent, or Firm* — Andrus Intellectual Property Law, LLP (57) ABSTRACT A lifting device is for a container. The lifting device is arranged to be attached at one end of the container. The lifting device comprises a tow bar being adjustable between an erect position and an unfolded position; an undercarriage connected to the tow bar and provided with one or more wheels, the undercarriage being adjustable between at least a raised position and a lowered position, and the undercarriage being arranged, in the lowered position, to carry at least part of the weight of the container. The undercarriage is arranged to be adjusted from the raised position into the lowered position by means of manual force and/or gravity. The undercarriage is arranged to be adjusted from the raised position to the lowered position when the end of the con-
(Continued)

tainer has been lifted above the supporting surface. A method is for using a lifting device for a container.

2 Claims, 11 Drawing Sheets

(51) Int. Cl.
*B65D 90/14* (2006.01)
*B62D 63/06* (2006.01)

(58) Field of Classification Search
USPC .............................. 280/43.12, 43.14, 43.24
See application file for complete search history.

(56) References Cited

U.S. PATENT DOCUMENTS

| | | | | |
|---|---|---|---|---|
| 2,783,055 | A * | 2/1957 | Michaud | B62B 3/0625 |
| | | | | 16/34 |
| 3,041,083 | A | 6/1962 | Blanc | |
| 3,243,193 | A * | 3/1966 | Bivins | B60P 7/13 |
| | | | | 254/45 |
| 3,423,101 | A * | 1/1969 | Boeye | B65D 88/522 |
| | | | | 217/12 R |
| 3,512,755 | A * | 5/1970 | Donakowski | B62B 1/00 |
| | | | | 254/131 |
| 3,631,999 | A | 1/1972 | Walerowski | |
| 3,788,683 | A * | 1/1974 | Rumell | B60P 7/132 |
| | | | | 280/43.14 |
| 4,266,796 | A * | 5/1981 | Riggs | B60P 3/1033 |
| | | | | 280/414.1 |
| 4,597,561 | A | 7/1986 | Wenzel | |
| 4,799,711 | A * | 1/1989 | Moore | B60D 1/155 |
| | | | | 280/444 |
| 4,863,334 | A * | 9/1989 | Girerd | B60P 1/6445 |
| | | | | 414/458 |
| 5,006,031 | A | 4/1991 | Fossing et al. | |
| 5,050,897 | A | 9/1991 | Stromberg | |
| 5,071,153 | A | 12/1991 | Duncan | |
| 5,169,194 | A * | 12/1992 | Yamashita | B60P 1/6427 |
| | | | | 220/1.5 |
| 5,628,522 | A * | 5/1997 | Hall | B60B 33/06 |
| | | | | 280/43.14 |
| 7,306,273 | B2 * | 12/2007 | Estes | B60P 1/6463 |
| | | | | 220/1.5 |
| 7,712,558 | B2 * | 5/2010 | Helson | B62B 5/0079 |
| | | | | 180/19.1 |
| 2002/0180179 | A1 * | 12/2002 | Krauss | B60D 1/065 |
| | | | | 280/460.1 |
| 2010/0226740 | A1 | 9/2010 | Humble et al. | |

FOREIGN PATENT DOCUMENTS

| | | |
|---|---|---|
| GB | 842923 | 7/1960 |
| GB | 2044688 | 10/1980 |
| SE | 390158 | 11/1976 |
| WO | 9312996 | 7/1993 |
| WO | 2012138229 | 10/2012 |

OTHER PUBLICATIONS

International Preliminary Report on Patentability for PCT/NO2013/050209 dated May 3, 2015.
Written Opinion for PCT/NO2013/050209 dated Mar. 20, 2014.
Written Opinion for PCT/NO2013/050209 dated Dec. 15, 2014.

* cited by examiner

LIFTING DEVICE FOR CONTAINER AND METHOD FOR USING THE SAME

CROSS-REFERENCE TO RELATED APPLICATIONS

This application is the U.S. national stage application of International Application PCT/NO2013/050209, filed Nov. 29, 2013, which international application was published on Jun. 12, 2014, as International Publication WO2014/088421 in the English language. The international application is incorporated herein by reference, in entirety. The international application claims priority to Norwegian Patent Application No. 20121.459, filed Dec. 5, 2012, and U.S. Provisional Application No. 61/733,749, filed Dec. 5, 2012 which are incorporated herein by reference, in entirety.

FIELD

A lifting device for a container is described, the lifting device being arranged to be attached at an end of the container, and the lifting device including a tow bar which is adjustable between an erect position and an unfolded position and an undercarriage connected to the tow bar and provided with one or more wheels, the undercarriage being adjustable between at least a raised position and a lowered position, and the undercarriage being arranged, in the lowered position, to carry part of the weight of the container. A method of using a lifting device for a container is described as well.

BACKGROUND

It is known that heavy transport equipment, such as a hook-lift truck, is provided with the necessary equipment and sufficient power to be able to lift and move a heavy container. As a container is rented, the driver of a hook-lift truck will usually place the container in a given location at a construction site, and leave it there. The container is picked up when it is full or as agreed. The drawback of this arrangement is that the container, as it is being filled up, becomes too heavy to be moved by smaller construction-site equipment such as tractors, forklift trucks or small excavators. The position of the container is therefore locked to the place in which the driver of the hook-lift truck put it down in the first place. Often, said driver will not be acquainted with the construction site, and the position of the container could therefore be unfavorable to the person or persons who are going to use the container or to others working in the same area. Generally, hook-lift trucks are also so large that the ability to navigate is restricted to open areas and relatively broad roads. After a container has been filled, completely or partially, it may be desirable to remove it or change its location within a construction site. This will not be possible without having to call in a hook-lift truck or the like, as mentioned above, and it will often lead to an unnecessarily long wait and extra cost to have the container moved or removed.

The patent document WO 2012/138229, filed by the present applicant, discloses a lifting device for a container, the lifting device including an actuator arranged to move an undercarriage of the lifting device down into engagement with the supporting surface so that an end of the container is lifted above the supporting surface. This solution requires that the actuator should have hydraulic, pneumatic or electrical power available to lift the container.

SUMMARY

The invention has for its object to remedy or reduce at least one of the drawbacks of the prior art or at least provide a useful alternative to the prior art.

The object is achieved through features which are specified in the description below and in the claims that follow.

In the present application, the term "container" is meant in a wide sense, no that the term includes all types of containers for the transport and temporary storage of goods, in both solid and liquid forms. It may be, for example, but is not limited to, different types of transport containers, hook-lift containers and dump bodies of different sizes and geometries. It is an advantage if a container with a lifting device attached to it, as described in what follows, is provided with one or more wheels at an end of the container opposite an end to which the lifting device is attached. Together with a lifting device in accordance with the invention, this will make it possible for a heavy, fully loaded transport container to be moved locally within a construction site by, for example, but not limited to, a tractor or a small construction-site engine.

The present invention provides a lifting device with an adjustable tow bar for a container, in which an undercarriage of the lifting device can be adjusted into a lowered position and locked in the lowered position while the end of the container, at which the lifting device is placed, is lifted above the supporting surface. Thus, the invention provides an alternative and simplified version of the above-mentioned WO publication, which will function without a hydraulic, electrical or pneumatic power supply to the lifting device.

In a first aspect, the invention relates to a lifting device for a container, the lifting device being arranged to be attached at an end of the container, and the lifting device comprising:
  a tow bar being adjustable between an erect position and an unfolded position;
  an undercarriage connected to the tow bar and provided with one or more wheels, the undercarriage being adjustable between at least a raised position and a lowered position, and the undercarriage being arranged, in the lowered position, to carry part of the weight of the container, characterized by the undercarriage being arranged to be brought from the raised position into the lowered position by means of manual force and/or gravity, the undercarriage being arranged to be brought from the raised position to the lowered position when the end of the container has been lifted above the supporting surface.

On its side facing away from the container, the tow bar may be provided with a hook-connection element, so that the tow bar may constitute a connection point for a hook-lift truck which is to put down or pick up a container with a lifting device in accordance with the invention.

In one embodiment, the lifting device may include a sliding rail arranged to be locked at least in an upper position and in a lower position corresponding to, respectively, the raised position and the lowered position of the undercarriage. The sliding rail may be connected to the undercarriage of the lifting device, either directly or indirectly via various connecting parts.

In its erect position, the tow bar may be arranged to be locked to the container. The locking may be carried out by the tow bar being formed with a transverse bar complementarily fitting into locking dogs on the container.

The tow bar may further be arranged to be released from the container when the undercarriage is moved into its lowered position, by the transverse bar of the tow bar being released from the locking dogs of the container.

In one embodiment, the tow bar of the lifting device may be telescopic so that the length of the tow bar is adjustable. An advantage of this is that the undercarriage of the lifting device, which is connected to the tow bar, can be adjusted into its lowered position at the same time as the tow bar is being extended, so that the tow bar may still be locked to the locking dogs of the container by means of the transverse bar. In an embodiment like that, the container may be operated without support legs or the like for holding an end of the container while the undercarriage is being adjusted into its lowered position.

In a second aspect, the invention relates to a method of using a lifting device for a container, the lifting device being provided with an undercarriage, and the method including the step of attaching the lifting device to an end of the container, the method being characterized by further including the following steps:
 lifting the end of the container from the supporting surface into a lifted position;
 lowering the undercarriage from a raised position into a lowered position by means of manual force and/or gravity;
 locking the undercarriage in the lowered position; and
 partially lowering the container from its lifted position so that at least part of the weight of the container is resting on the undercarriage.

The step of lifting an end of the container up from the supporting surface into a lifted position may include lifting the container with the aid of a hook-lift truck.

Further, the step of lowering the undercarriage from a raised position into a lowered position may further include extending the tow bar, which is telescopic.

As an alternative or in addition, after the step of lifting an end of the container, the method may include adjusting one or more support legs of the container into a lowered position, wherein the support legs in the lowered position are arranged to carry at least part of the weight of the container. The support legs may be lowered when a hook-lift truck is about to put the container down, so that the support legs may carry part of the weight of the container while the undercarriage is being adjusted into its lowered position.

The method may further include unfolding the tow bar from an erect position into an unfolded position; and
 connecting the tow bar to a vehicle, whereby the container can be moved by the vehicle, the tow bar possibly being provided with a transverse bar and an eye hook.

BRIEF DESCRIPTION OF THE DRAWINGS

In what follows, examples of preferred embodiments are described, which are visualized in the accompanying drawings, in which.

DETAILED DESCRIPTION OF THE DRAWINGS

In what follows, the reference numeral 1 indicates a lifting device in accordance with the invention. Like reference numerals indicate like or corresponding elements.

Figure 1:
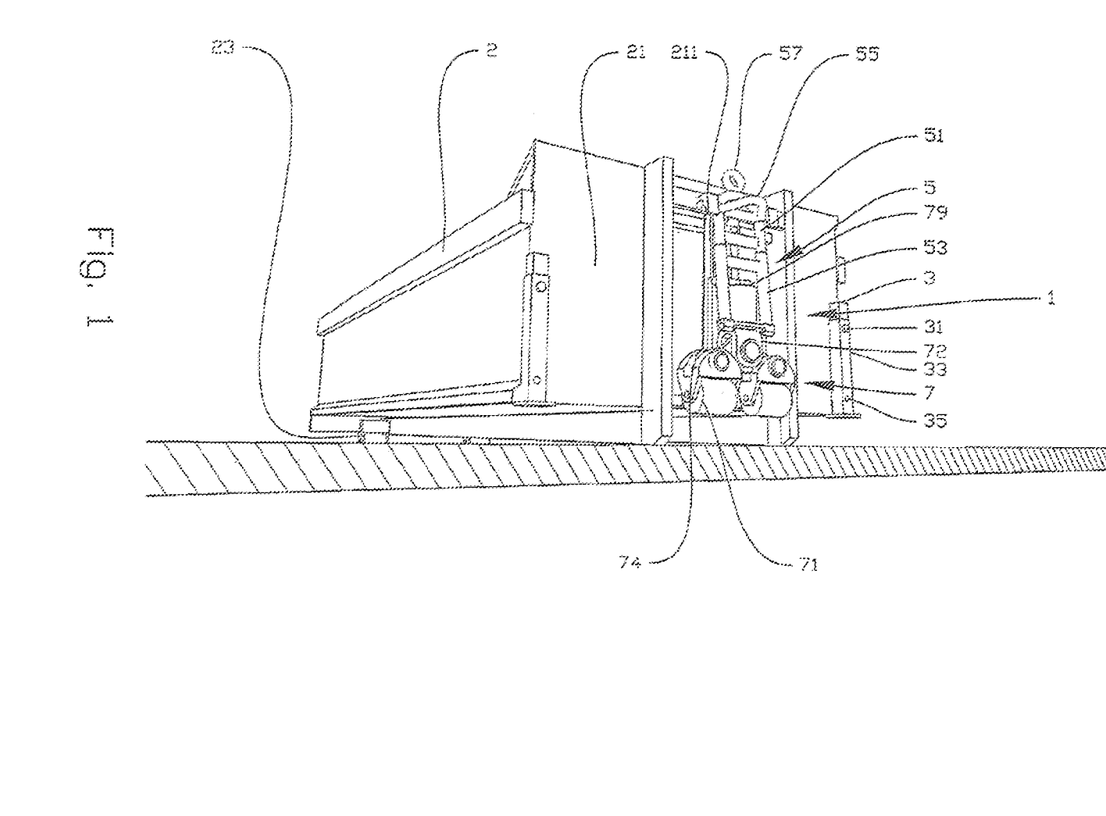
FIG. 1 shows, in a perspective view, a container including a lifting device in accordance with the invention.

FIG. 1 shows a container 2 provided with a lifting device 1 in accordance with the invention. The lifting device 1 is attached at an end face 21 of the container 2. The lifting device 1 includes a tow bar 5, the tow bar 5 being provided, on its side facing away from the container 2, with a hook-connection element 55. The tow bar 5 is further attached to an undercarriage 7 of the lifting device 1. The tow bar 5, which is shown in an erect position in the figure, is arranged to be rotated between the erect position and an unfolded position, see FIG. 6, the tow bar 5 being rotatably connected to the undercarriage 7 around a substantially horizontal rotational axis 781, see FIG. 8, parallel to the end face 21 of the container 2. The undercarriage 7 includes a connecting part 72 which is rotatably connected to an intermediate piece 73 around a first rotational axis 721. The intermediate piece 73 is further connected to two wheel brackets 74 with wheels 71 around second rotational axes 731. Both the first rotational axis 721 and the second rotational axes 731 are substantially horizontal normal to the end face 21 of the container 2. The undercarriage 7 further includes a sleeve 79 to which the connecting part 72 is rotatably connected around a substantially vertical rotational axis 791, see FIG. 8.

At opposite sides of the end face 21, the container 2 is provided with support legs 3. The support legs 3, which are shown in a raised position in FIG. 1, are arranged to be adjusted into a lowered position, see FIGS. 3-5. Locking bolts 31 complementarily fit bolt holes 35 in a rectangular frame 33 and bolt holes, not shown, in the support legs 3. By pulling the locking bolts 31 out of upper holes 35 of the rectangular frames 33, the support legs 3 are released, moving/gliding in the rectangular frames 33. The locking bolts 31 may then be inserted into lower bolt holes 35 in the rectangular frames 33, the lower bolt holes 35 now corresponding with the bolt holes, not shown, in the support legs 3, so that the support legs 3 are locked in a lowered position.

Figure 2:
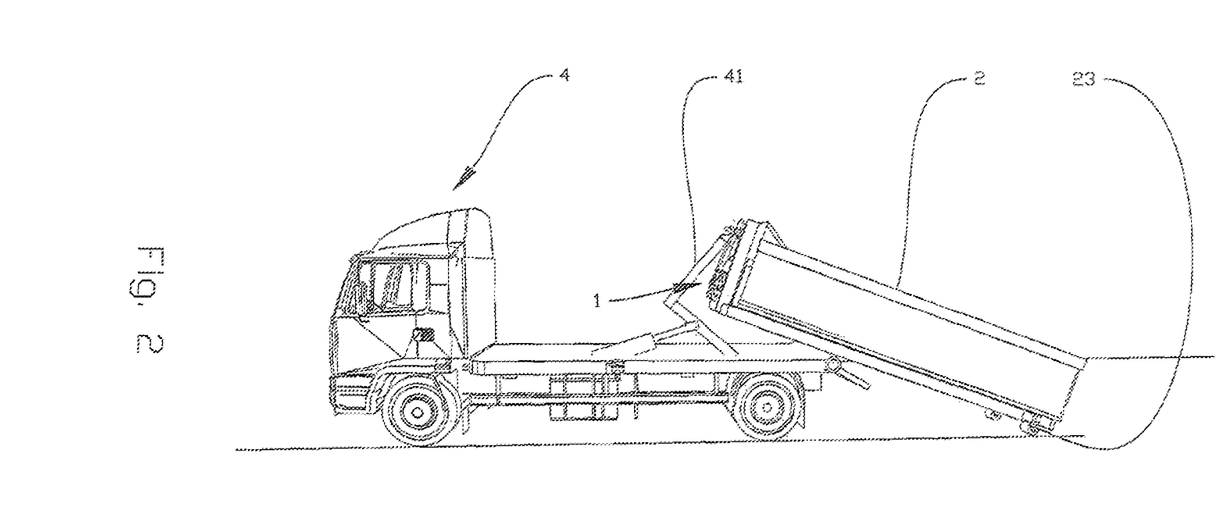
FIG. 2 shows, in a side view and on a smaller scale, a hook-lift truck and a container including a lifting device in accordance with the invention.

In FIG. 2, a prior-art hook-lift truck 4 is shown as it is about to put down a container 2 with a lifting device 1 in accordance with the invention. A lifting arm 41 is provided with a hook 43, see FIG. 3, to which the container 2 is attached by means of the hook-connection element 55 of the tow bar 5.

Figure 3:
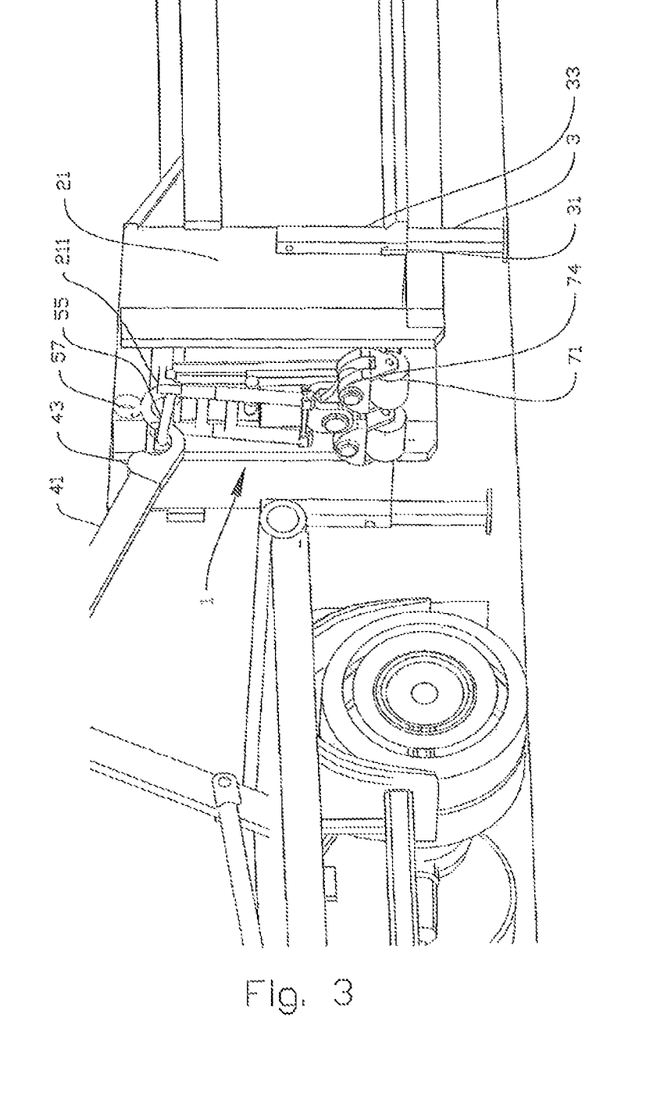
FIG. 3 shows, in a perspective view and on a somewhat larger scale than FIG. 2, parts of a hook-lift truck and a container including a lifting device in accordance with the invention.

Further details of the lifting arm 41 with the hook 43 and a portion of the container 2 are shown in FIG. 3. The lifting arm 41 is holding the container 2 with the lifting device 1 in a raised position while the support legs 3 have been adjusted into the lowered position. In the lowered position, the support legs 3 are arranged to carry at least part of the weight of the container 2. The lifting arm 41 with the hook 43 may then be released from the hook-connection element 55, the weight of the container now resting on the support legs 3 and rear wheels 23 of the container 2.

Figure 4:
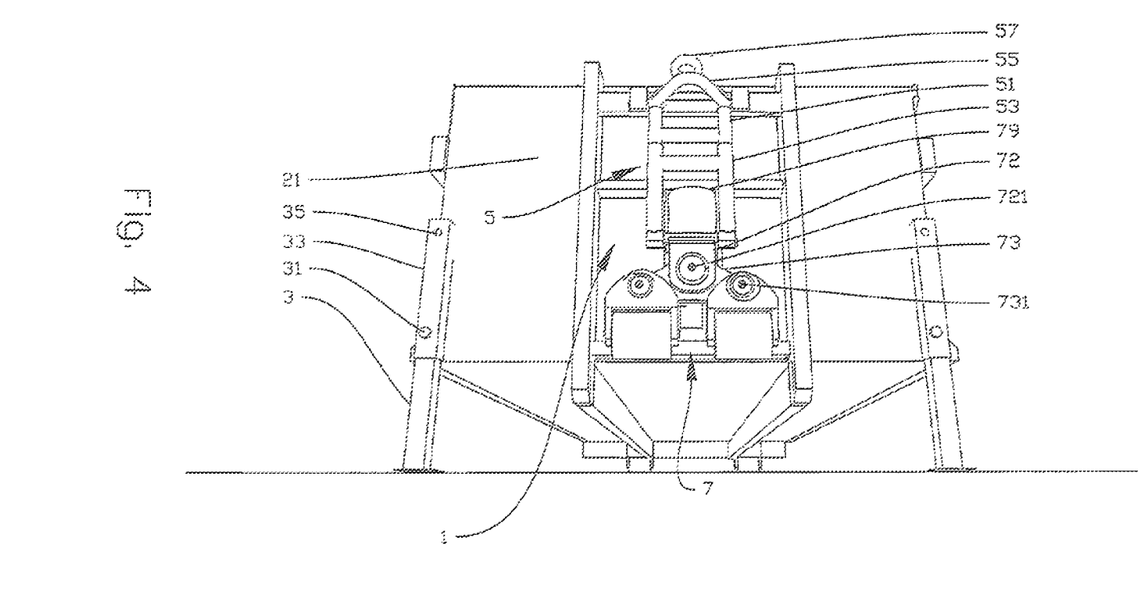
FIGS. 4-5 show, in front views and on a somewhat larger scale than FIG. 1, a container including a lifting device in accordance with the invention.

In FIG. 4, the container 2 is shown after it has been put down on the ground by the hook-lift truck 4. The support legs 3 and rear wheels 23 carry the weight of the container 2, whereas the undercarriage 7 of the lifting device 1 is still in a raised position.

Figure 5:
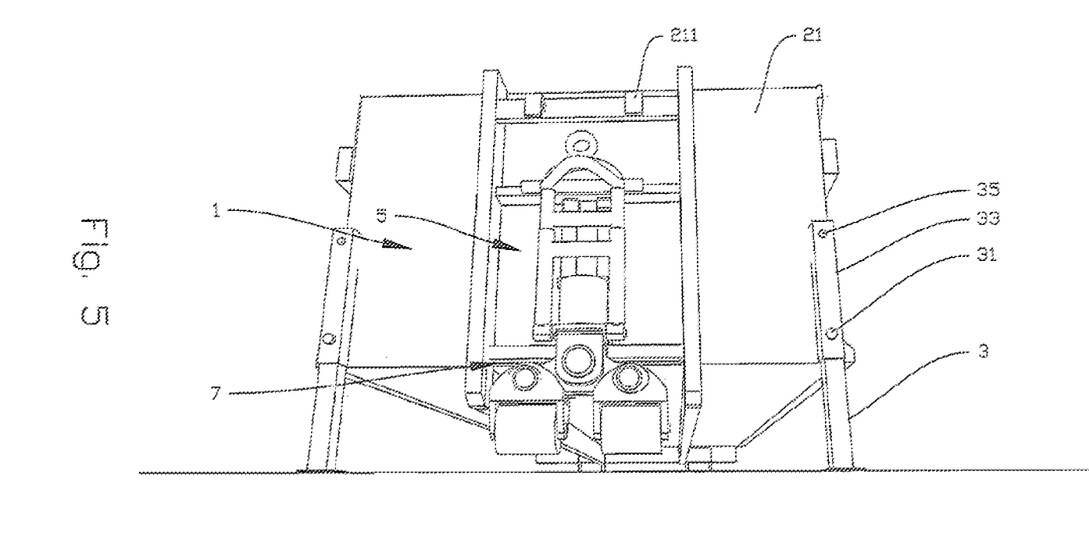
Figure 6:
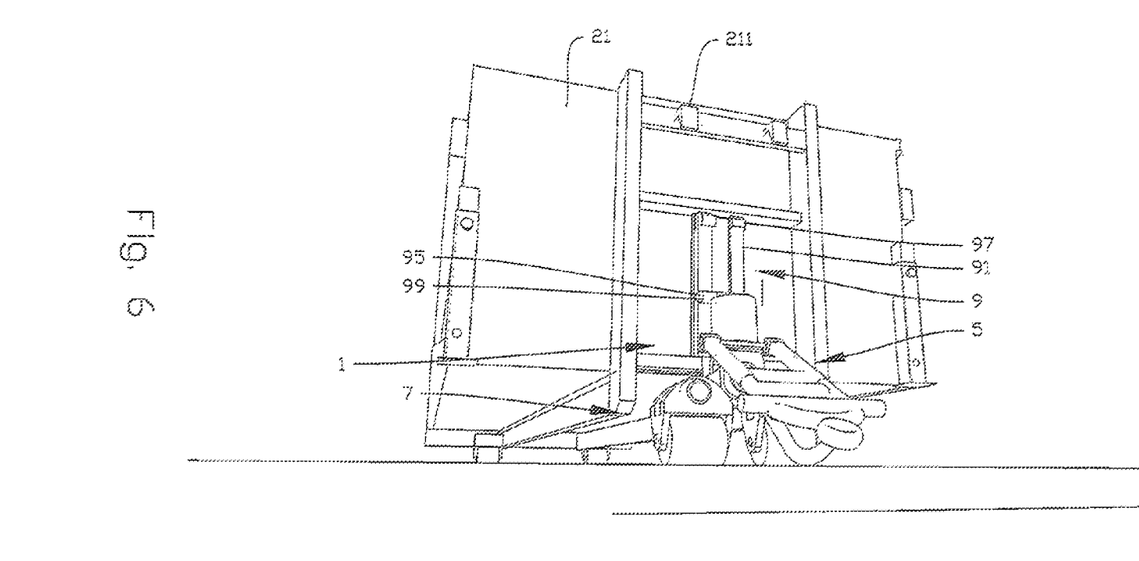
FIG. 6 shows, in a perspective view and on the same scale as FIGS. 4 and 5, a container including a lifting device in accordance with the invention.

The undercarriage 7 of the lifting device 1 is arranged to be adjusted between a raised position, as shown in FIGS. 1-4, and a lowered position, as shown in FIGS. 5-6. In FIG. 5, the weight of the container 2 is still resting on the support legs 3 and rear wheels 23 even though the undercarriage 7 has been adjusted into a lowered position. To move the support legs 3 back into the raised position, the hook-lift truck 4 may again lift the end 21 of the container 2 slightly up from the supporting surface so that there is no weight resting on the support legs 3 as these are being displaced. The container 2 is then put down on the supporting surface so that its weight is now resting on the wheels 71 of the undercarriage and on the rear wheels 23. The displacement of the undercarriage 7 of the lifting device 1 between the raised position and the lowered position will be explained in more detail below with reference to FIGS. 6 and 10.

In FIG. 6, the container 2 is shown after the support leas 3 have been moved back into the raised position, as described above, so that the weight of the container 2 is now resting on the wheels 71 of the undercarriage 7 and on the rear wheels 23. Further, the tow bar 5 has been unfolded into its unfolded position so that the container 2 can be moved by a vehicle, not shown, being connected to the eye hook 57 or transverse bar 59 of the tow bar 5, see FIG. 9. The transverse bar 59 of the tow bar 5 is also arranged to lock the tow bar to the container 2 in the erect position of the tow bar 5, as the end face 21 of the container 2 is provided with a set of locking dogs 211. Parts of a displacing device 9 of the lifting device 1 are shown in FIG. 6 as well. The displacing device 9 includes a frame 91 in which a sliding rail 93, see FIG. 10, is slidably positioned. The displacing device 9 further includes a locking bolt 95 which is arranged to lock the sliding rail 93 in an upper position and in a lower position by means of, respectively, upper lock mandrels 97 and lower lock mandrels 99 on the frame 91 and a lock mandrel 98, see FIG. 10, on the sliding rail 93. The sliding rail 93 is attached to the sleeve 79, see FIG. 8, which is further connected to the undercarriage 7 of the lifting device.

Figure 7:
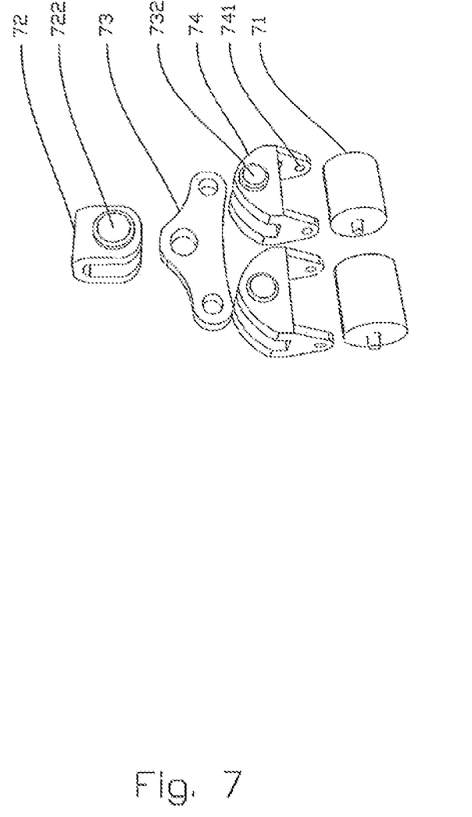
FIGS. 7-10 show, in perspective views and on larger scales, various details of lifting device in accordance with the invention.

In FIG. 7, part of the undercarriage 7 of the lifting device 1 is shown in an exploded drawing. The coupling part 72 is shown at a distance from the intermediate piece 73 and the wheels 71 with the wheel brackets 74. The coupling part 72 and the intermediate piece 73 and the intermediate piece 73 and the wheel brackets 74 are rotatable relative to each other around an axle 722 and axles 732, respectively. The wheels 71 are further provided with journals complementarily fitting attachment holes 741 in the wheel brackets 74.

Figure 8:
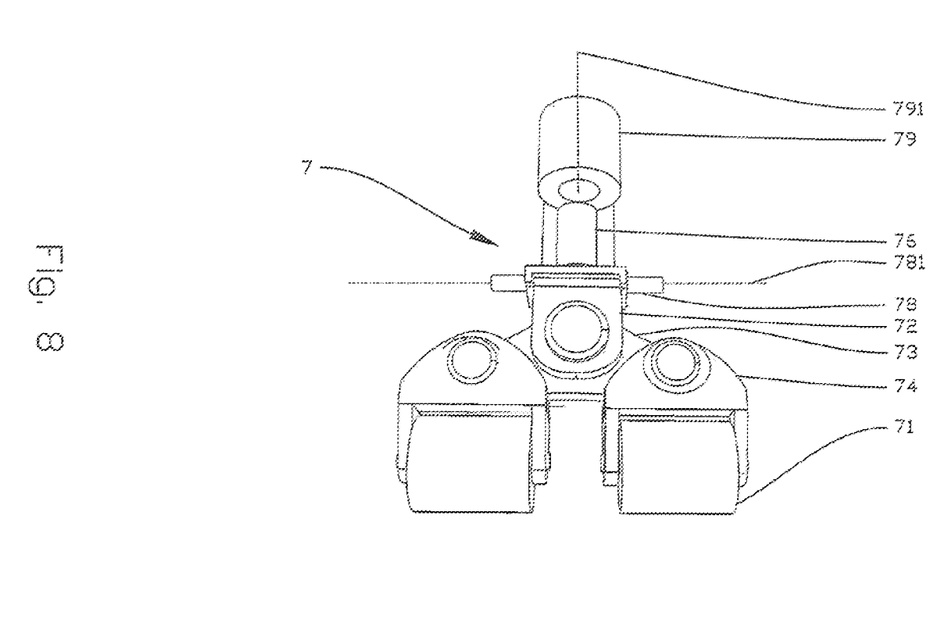

In FIG. 8, the undercarriage 7 is shown assembled and placed at a distance from the sleeve 79. The coupling part 72 is provided with a pin 76 complementarily fitting into the sleeve 79, whereby the undercarriage 7 may be rotated relative to the sleeve 79 around a substantially vertical rotational axis 791. The coupling part 72 is further provided with journals 78 to which the tow bar 5 is arranged to be attached by means of attachment holes 56, see FIG. 9, and be rotated around the above-mentioned rotational axis 781.

Figure 9:
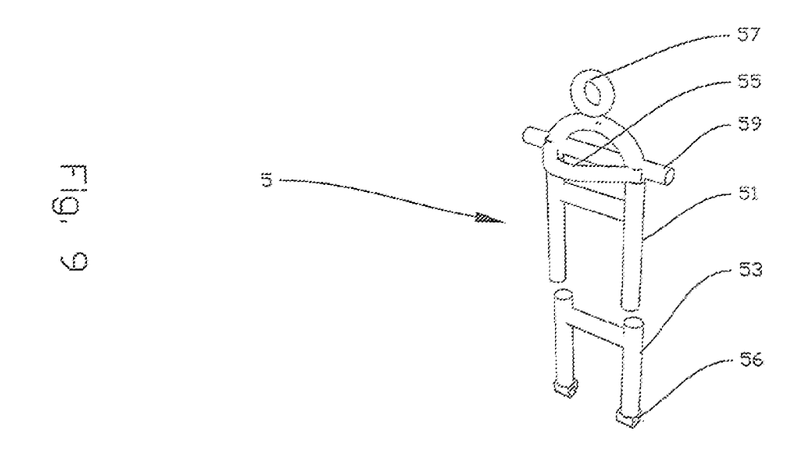
Figure 10:
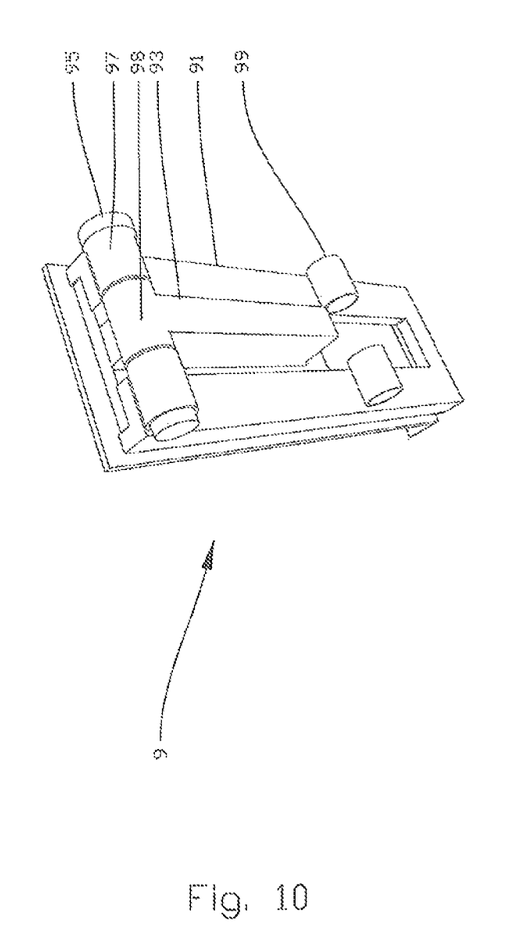

In FIG. 9, the tow bar 5 is shown in an exploded drawing, in which a movable, U-shaped telescopic part 51 of the tow bar 5 is separate from a fixed H-shaped part 53 of the tow bar, which, in a position of application, is rotatably connected to the undercarriage 7 of the lifting device 1 around the rotational axis 781. The length of the tow bar 5 can be adjusted by the telescopic part 51 being moved relative to the fixed part 53 and secured by means of securing means, not shown, in a desired position. The securing means may be, for example, bolts not shown, complementarily fitting bolt holes. Attachment holes 56 at the bottom of the tow bar 5 are used for the attachment of the tow bar 5 to the journals 78 on the coupling part 72 of the undercarriage 7.

In FIG. 10, the displacing device 9 of the lifting device 1 is shown in more detail. The displacing device 9 has the effect of making the undercarriage 7 displaceable from a raised position into a lowered position, the displacing device 9 being fixed to the sleeve 79 of the undercarriage 7. The sliding rail 93 is slidably positioned inside the frame 91. The locking bolt 95 complementarily fits into upper lock mandrels 97 and lower lock mandrels 99 as well as into the lock mandrel 98 on the sliding rail 93, whereby the sliding rail 93 can be locked in an upper position and a lower position corresponding to the raised position and the lowered position, respectively, of the undercarriage 7.

Figure 11:
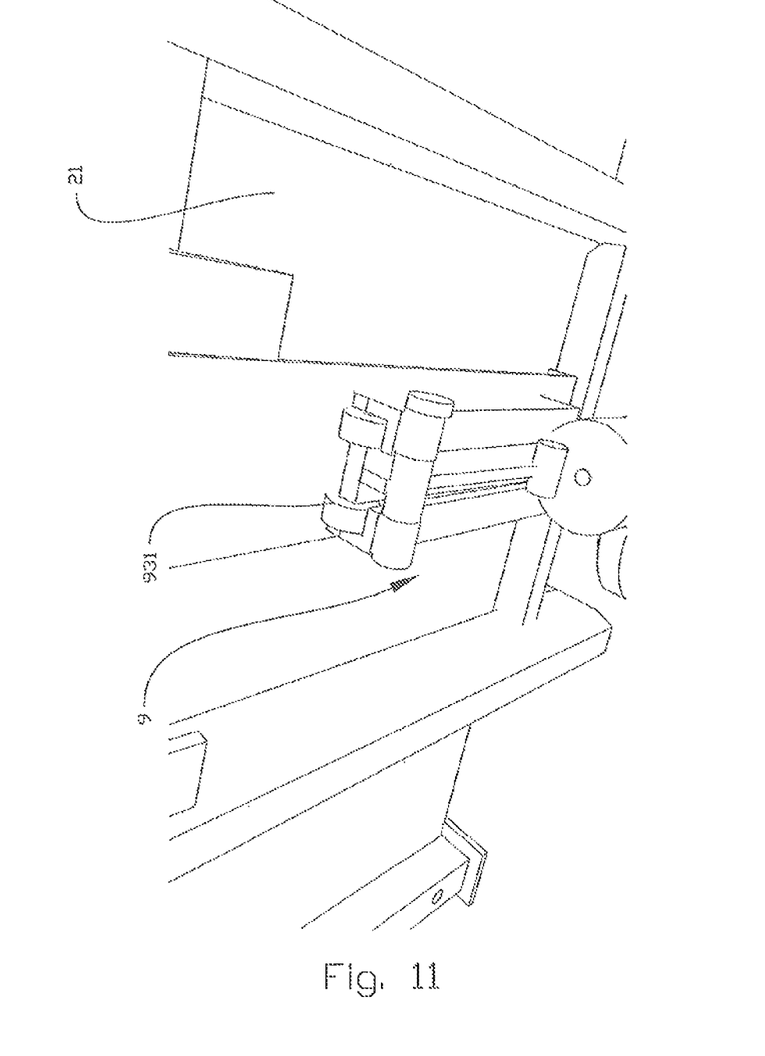
FIG. 11 shows, in a view an angle from above and on a smaller scale, part of an alternative embodiment of a lifting device in accordance with the invention.

In FIG. 11, another embodiment of the lifting device 1 is shown, in which the sliding rail 93 is provided with wheels 931 which reduce the friction of the sliding rail 93 inside the frame 91.

The invention claimed is:

1. A hook-lift container and a lifting device for the hook-lift container, the lifting device being configured for attachment at one end of the hook-lift container, and the lifting device comprising:
   an undercarriage provided with one or more wheels, the undercarriage being adjustable between at least a raised position and a lowered position, and the undercarriage being configured, in the lowered position, to carry at least part of the weight of the hook-lift container, wherein the undercarriage is configured to be caused to move from the raised position into the lowered position by manual force and/or gravity, the undercarriage being configured to be caused to move from the raised position to the lowered position when the end of the hook-lift container has been lifted above a supporting surface;
   wherein the lifting device further comprises a tow bar being adjustable between an erect position and an unfolded position, the tow bar being provided with a hook connection element facing away from the hook-lift container in the erect position of the tow bar, the hook-connection element constituting a connection point for a hook-lift truck, the tow bar being connected to the undercarriage;
   wherein the lifting device includes a sliding rail configured to be locked at least in an upper position and in a lower position, corresponding to the raised position and the lowered position, respectively, of the undercarriage; and
   wherein the hook-lift container is provided with one or more support legs adjustable between a raised leg position and a lowered leg position, where the one or more support legs in the lowered position is/are configured to carry at least a portion of the weight of the hook-lift container.

2. A method of lifting a hook-lift container using a lifting device comprising
   an undercarriage provided with one or more wheels, the undercarriage being adjustable between at least a raised position and a lowered position, and the undercarriage being configured, in the lowered position, to carry at least part of the weight of the hook-lift container, wherein the undercarriage is configured to be caused to move from the raised position into the lowered position by manual force and/or gravity, the undercarriage being configured to be caused to move from the raised position to the lowered position when the end of the hook-lift container has been lifted above a supporting surface;

wherein the lifting device further comprises a tow bar being adjustable between an erect position and an unfolded position, the tow bar being provided with a hook connection element facing away from the hook-lift container in the erect position of the tow bar, the hook-connection element constituting a connection point for a hook-lift truck, the tow bar being connected to the undercarriage;

wherein the lifting device includes a sliding rail configured to be locked at least in an upper position and in a lower position, corresponding to the raised position and the lowered position, respectively, of the undercarriage; and wherein the hook-lift container is provided with one or more support legs adjustable between a raised leg position and a lowered leg position, where the one or more support legs in the lowered position is/are configured to carry at least a portion of the weight of the hook-lift container;

the method comprising:
attaching the lifting device to the end of the hook-lift container;
lifting the end of the hook-lift container up from the supporting surface into a lifted position by the hook-lift truck;
adjusting the one or more support legs of the hook-lift container into the lowered leg position, the one or more support legs being configured, in the lowered leg position, to carry at least part of the weight of the hook-lift container;
adjusting the undercarriage from the raised position into the lowered position by manual force and/or gravity;
locking the undercarriage in the lowered position;
again lifting the end of the hook-lift container up from the supporting surface to the lifted position;
adjusting the support legs back into the raised leg position; and
partially lowering the hook-lift container from the lifted position so that at least part of the weight of the hook-lift container is resting on the undercarriage.

* * * * *